United States Patent
Jones, IV

(10) Patent No.: US 7,266,183 B1
(45) Date of Patent: Sep. 4, 2007

(54) MESSAGE DELIVERY SYSTEM

(75) Inventor: Robert Jones, IV, 1050 Antler Dr., Glen Mills, PA (US) 19342

(73) Assignees: David B. Soll, Ambler, PA (US); Robert Jones, IV, York, SC (US)

( * ) Notice: Subject to any disclaimer, the term of this patent is extended or adjusted under 35 U.S.C. 154(b) by 0 days.

(21) Appl. No.: 11/002,880

(22) Filed: Dec. 2, 2004

Related U.S. Application Data

(60) Provisional application No. 60/527,055, filed on Dec. 4, 2003.

(51) Int. Cl.
*H04M 1/64* (2006.01)

(52) U.S. Cl. .............. 379/88.25; 379/93.35; 379/201.1; 370/352

(58) Field of Classification Search .......... 379/265.01, 379/218.01, 88.25, 93.25, 201.1; 370/352
See application file for complete search history.

(56) References Cited

U.S. PATENT DOCUMENTS

| | | | |
|---|---|---|---|
| 4,401,860 A | 8/1983 | Walls | |
| 5,311,588 A | 5/1994 | Polcyn | |
| 5,751,794 A * | 5/1998 | Kugell et al. | 379/88.22 |
| 5,920,623 A | 7/1999 | Bensman | |
| 6,343,073 B1 * | 1/2002 | Mashinsky | 370/352 |
| 6,351,522 B1 * | 2/2002 | Vitikainen | 379/67.1 |
| 6,782,095 B1 | 8/2004 | Leong | |
| 6,782,358 B2 | 8/2004 | Cox | |
| 6,928,156 B2 * | 8/2005 | Book et al. | 379/265.01 |
| 2001/0008553 A1 | 7/2001 | Cox | |
| 2003/0190038 A1 | 10/2003 | Das | |

OTHER PUBLICATIONS

"Intel® Dialogic® ProLine/2V," Intel® Telecom Products web advertisement, 5 pages; Dec. 3, 2003 printout.

* cited by examiner

*Primary Examiner*—Gerald Gauthier
(74) *Attorney, Agent, or Firm*—Akin Gump Strauss Hauer & Feld LLP

(57) ABSTRACT

A method for a telephone dialing apparatus to deliver a message to a customer premise is described. The method includes the steps of: initiating a telephone call by dialing a telephone number; enabling the apparatus to receive an off-hook signal; enabling the apparatus to detect a first tone if the off hook signal is received; enabling the apparatus to detect a second tone if the first tone is detected; terminating the call if the second tone is detected and transmitting the message to the customer premise if the second tone is not detected.

7 Claims, 2 Drawing Sheets

MESSAGE DELIVERY SYSTEM

CROSS-REFERENCE TO RELATED APPLICATIONS

This application claims the benefit of Provisional Application No. 60/527,055 filed Dec. 4, 2003, entitled "Phone Zapper Detection Technique", which is hereby incorporated by reference in its entirety.

BACKGROUND OF THE INVENTION

The present invention is a message deliver system and more particularly, is a computerized telephone dialer that recognizes and defeats the action of devices designed to fool computerized telephone dialers into believing that a phone call can not be completed.

Predictive dialers (PDs) are computerized telephone dialers used by telemarketers to place, at a rapid rate, telephone calls to customer premises. The PDs sort through all the placed calls to find the few that are actually answered by a person. When a call is found that is answered by a person, the call is quickly transferred to a live telemarketing agent.

Predictive dialers sort the placed calls by monitoring the progress of each call and take action based on what happens when the called telephone is answered, i.e. goes off-hook. A chart of typical PD actions is shown in Table 1 below:

TABLE 1

| Event | PD Action |
| --- | --- |
| Busy Tone | PD hangs up |
| Disconnect tone (Special Information Tone - SIT) | PD hangs up. If an SIT is found on repeated calls, the telephone number is deleted from the call list. |
| No answer | PD hangs up |
| Answering machine | PD hangs up |
| Live answer | PD searches for a live agent. If one is available, the call is switched to an agent. If none is available within a predetermined time, the PD hangs up. |

Devices for defeating predictive dialers have been introduced into the marketplace. These devices, called colloquially, "zappers" or "zapping devices", are connected to a customer's telephone line at the customer's premises. Zapping devices disconnect a calling predictive dialer from the called telephone number by placing a signal on the telephone line that appears to the predictive dialer to be a type of Special Information tone (SIT) signal. Such signals are used by United States telephone companies to signal ineffective call attempts.

Each type of SIT signal is characterized by a unique three tone sequence. A particular SIT, used generally by zapping devices for defeating a predictive dialer, is the operator intercept (OI) sequence consisting of a first tone at 913.8 Hz., a second tone at 1370.6 Hz. and a third tone 1776.7 Hz. Zapping devices generally operate by detecting when the called telephone is taken off hook and thereafter generating the first tone of the OI sequence, thereby deceiving a typical predictive dialer into believing that the called telephone number is not in service. In response, the predictive dialer releases the telephone line before a message from the predictive dialer is transmitted to the called telephone number. Generally, it is necessary for the zapping device to generate only the first tone of the OI sequence to defeat a PD, since a PD, in the interest of conserving time, determines that a full SIT signal has been generated with the detection of the first tone.

There are computerized telephone calls which need to be completed despite the existence of a zapping device on the telephone line of the number being called. Such calls include appointment reminder calls from, for instance, a physicians office, or public emergency notification calls. Accordingly, there is a need for a telephone dialers, that can distinguish the signal generated by the zapping device from a true SIT signal in order to deliver a desired message to the called telephone member. Further, the desired message needs to be deliverable by the telephone dialer whenever the telephone is answered, whether by a human or by a machine such as an answering machine, a facsimile or a modem.

Prior solutions for defeating the result of an emergency or appointment call being "zapped" require a human to place a follow up telephone call to the called telephone number in order to determine if the telephone number that was zapped was actually not in service. A preferred solution to the problem would provide the means for automatically distinguishing the tones generated by the zapping device from the tones of an actual SIT.

BRIEF SUMMARY OF THE INVENTION

A method for a telephone dialing apparatus to deliver a message to a customer premises, comprises the steps of: initiating a call by dialing a telephone number; enabling the apparatus to receive an off-hook signal; enabling the apparatus to detect a first tone if the off hook signal is received; enabling the apparatus to detect a second tone if the first tone is detected; terminating the call if the second tone is detected; and transmitting the message to the customer's premise if the second tone is not detected.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
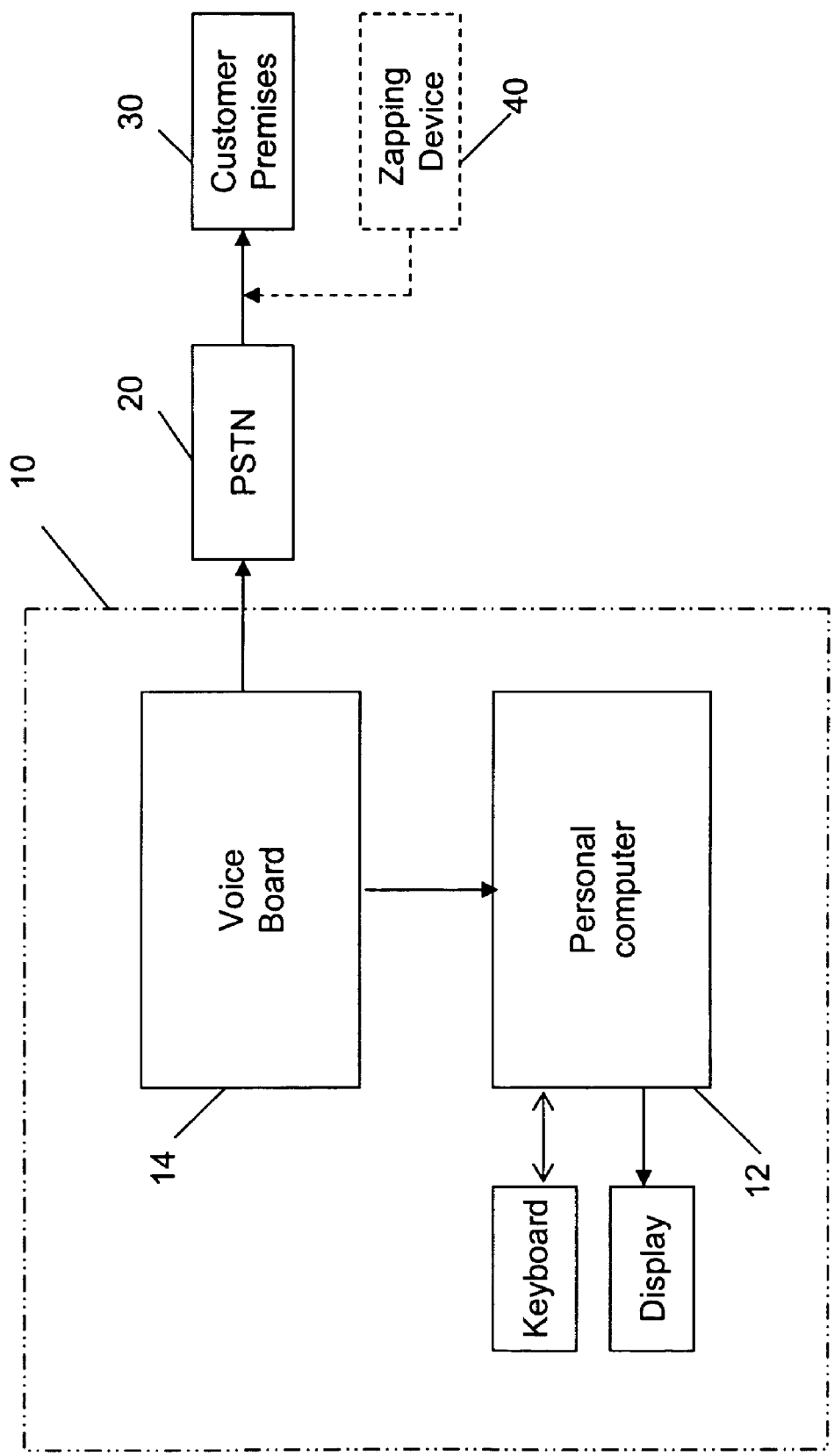
FIG. 1 is a functional block diagram of a telephone dialer connected to public switched telephone network.

Referring to the drawings, wherein like numerals are used to indicate like elements throughout the several figures and the use of the indefinite article "a" may indicate a quantity of one or more than one, of an element, there is shown in FIG. 1 a functional block diagram of a preferred embodiment of a telephone dialer 10 shown connected to a public switched telephone network (PSTN) 20 to which is connected at a customer premise, a telephone 30 and a zapper device 40.

In the preferred embodiment, the telephone dialer 10 comprises a personal computer 12 in which a special purpose telephony/voice board 14 installed. The personal computer 12 also includes volatile and non-volatile memory and input/output devices such as a video display, keyboard and mouse. Preferably, the personal computer uses a Pentium® processor as a central processing unit and runs one of the Windows® operating systems. Such computers are manufactured by IBM corporation, Hewlett Packard corporation and Dell corporation. While it is preferred that personal computer 12 uses a Pentium® processor and runs under the Windows® operating system, the invention is not limited to any particular type of computer or any particular operating system.

Preferably, the telephony/voice board 14 includes a digital signal processor, volatile and non-volatile memory and means for electrically interconnecting the telephony/voice board 14 with a personal computer 12. The telephony/voice board 14 is programmed to generate and detect dual tone multiple frequency (DTMF) and multiple frequency (MF) tones, used by the PSTN 20 for signaling. The telephony/voice board 14 can also be programmed to generate and detect application specific single and dual tones. The telephony/voice board 14 also: (1) transmits an off hook signal to the telephone line, (2) dials out, and (3) monitors and reports results to the personal computer 12 of line busy or congested, operator intercept, ring, no answer, or if the phone is answered, whether the phone is answered by a person, an answer machine, a modem, or a facsimile machine. Preferably, the telephony/voice board 14 is an Intel® Dialogic® Telephony Board Model Proline/2V, which includes all the foregoing features. As would be clear to one skilled in the art, the present invention is not limited to any particular telephony/voice board 14 as the implementation of such features as found in the Proline/2V are well known to those of ordinary skill in the art.

Figure 2:
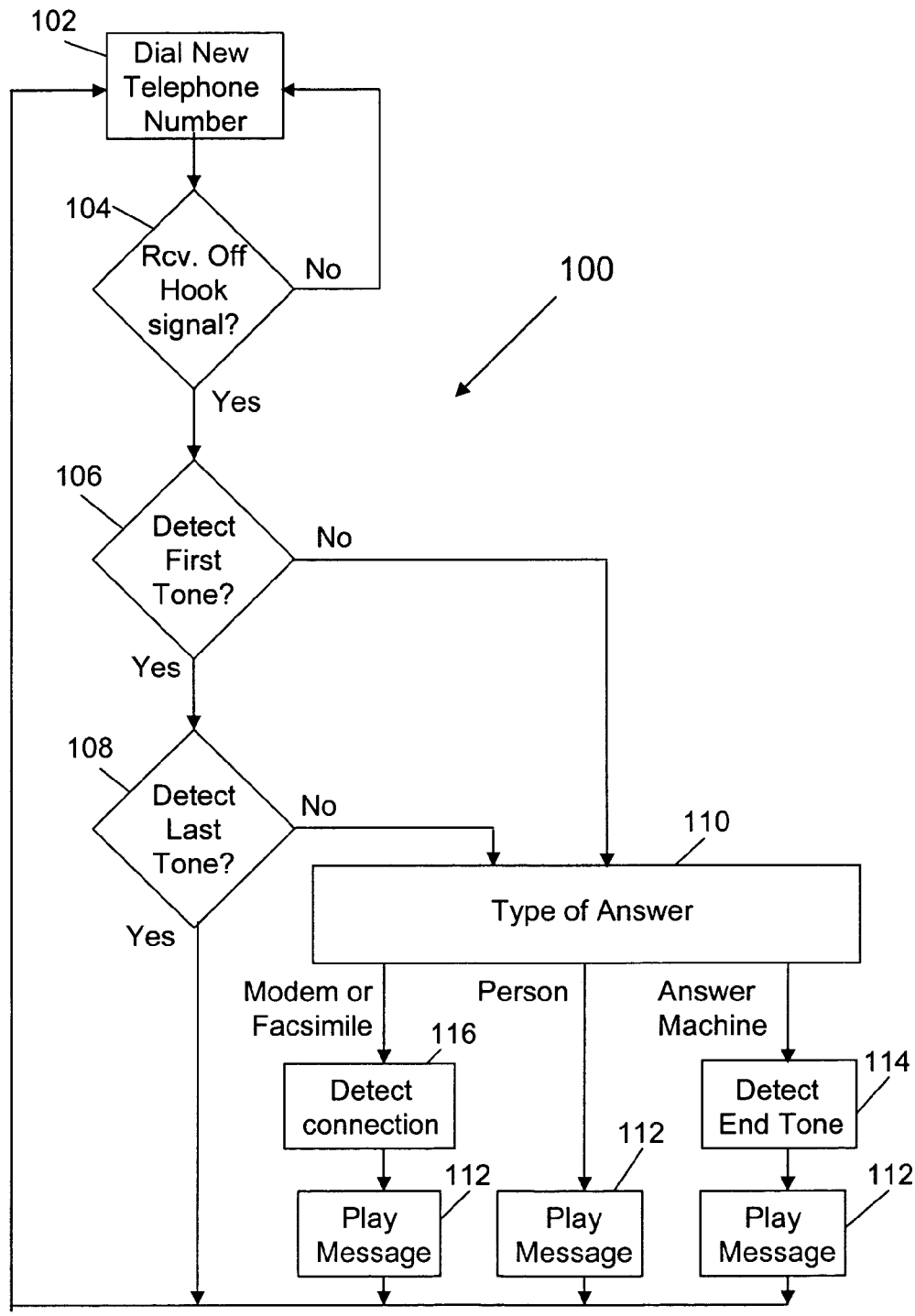
FIG. 2 is a flow diagram showing steps for delivering a message to a customer premise in accordance with a preferred embodiment of the invention.

Referring now to FIG. 2, there is shown a method of delivering a message to a customer premises in accordance with the preferred embodiment.

In the preferred embodiment, the personal computer 12 includes within it, a database of telephone numbers to be called, and pointers to messages corresponding to the telephone numbers, recorded in the non-volatile memory of the personal computer 12 to be delivered to each telephone number. At step 102, a program in the personal computer 12 initiates a telephone call to a selected telephone number by signaling the telephony/voice board 14 to take the telephone dialer 10 off hook. The program in the personal computer 12 then accesses the database for the selected telephone number to be called and provides a sequence of digits to the telephony/voice board 14 corresponding to the telephone number. Upon receiving a dial tone from the public switched telephone network (PSTN), the telephony/voice board 14 converts each digit received from the personal computer 12 to a DTMF tone and transmits a sequence of the DTMF tones to the PSTN 20. The telephony/voice board 14 then waits for an off hook signal to be received from the called telephone 30 (step 104). If a system information tone signal (SIT) or a busy signal is received before an off hook signal is received from the called telephone 30, or the off hook signal is not received within a predetermined time, such as for an unanswered call, the personal computer 12 resets the telephony/voice board 14. The personal computer 12 then signals the telephony/voice board 14 to take the telephone dialer 10 off hook and to initiate the dialing sequence for a new telephone number (step 102). If on the other hand, the off hook signal is received 104 within the predetermined time, the telephony/voice board 14 is enabled to detect a zapping device 40. In the preferred embodiment, the telephony/voice board 14 detects a zapping device 40 by detecting a first tone of a tone sequence having predetermined features (step 106). Preferably the first tone is the first tone of an SIT signal and more preferably, the first tone is the first tone of an operator intercept signal (OI). If the first tone is not detected, the telephone dialer 10 assumes that a zapping device 40 is not on the line. The telephony/voice board 14 of the telephone dialer 10 then determines if the telephone call is being answered by a modem or a facsimile, a person or an answering machine (step 110).

If the telephony/voice board 14 determines that the telephone call was answered by a person, the telephony/voice board 14 signals the personal computer 12, which then retrieves from the computer memory a recorded message corresponding to the called telephone number. The personal computer 12, upon retrieving the recorded message, transmits the message to the telephony/voice board 14 which then transmits the message through the PSTN 20 to the customer premises 30 (step 112). Upon completing the transmission, the personal computer 12 then commands the telephony/voice board 14 to terminate the call and, if there are additional calls to be made, initiates the dialing sequence for a new telephone number (step 102).

If the telephony/voice board 14 determines that the telephone call was answered by an answer machine, the telephony/voice board 14 signals the personal computer 12 which then commands the telephony/voice board 14 to detect the ending tone of the answer machine (step 114). When the telephony/voice board 14 detects the ending tone, the telephony/voice board 14 signals the personal computer 12 which then retrieves from the computer memory a recorded message corresponding to the called telephone number. The personal computer 12, upon retrieving the recorded message, transmits the message to the telephony/voice board 14 which then transmits the message through the PSTN 20 to the customer premises 30 (step 112). Upon completing the transmission, the personal computer 12 then commands the telephony/voice board 14 to terminate the call and, if there are additional calls to be made, initiates the dialing sequence for a new telephone number (step 102).

If the telephony/voice board 14 determines that the telephone call was answered by a facsimile machine or a modem, the telephony/voice board 14 signals the personal computer 12 which then commands the telephony/voice board 14 to detect the connection sequence of the facsimile machine or the modem (step 116). When the telephony/voice board 14 detects completion of the connection sequence, the telephony/voice board 14 signals the personal computer 12, which then retrieves from the computer memory a facsimile message or a data message corresponding to the called telephone number. The personal computer 12, upon retrieving the message stored in the computer memory, transmits the message to the telephony/voice board 14 which then transmits the message through the PSTN 20 to the customer premises 30 (step 112). Upon completing the transmission, the personal computer 12 then commands the telephony/voice board 14 to terminate the call and, if there are additional calls to be made, initiates the dialing sequence for a new telephone number (step 102).

If on the other hand, the telephony/voice board 14 detects the first tone, the telephony/voice board 14 is enabled to detect a second tone. If a second tone having predetermined characteristics is detected (step 108), the telephone call is terminated and a new call to a new telephone number is initiated, as described above. Preferably, the second tone is the third tone of an OI sequence. If the second tone is not detected at step 108, the telephone dialer 10 determines that the first tone was generated by a zapping device 40. The telephony/voice board 14 of the telephone dialer 10 then determines if the telephone call is being answered by a modem or a facsimile, a person or an answering machine (step 110) and transmits the message to the customer premises as described above.

It should be understood that the invention is not limited to detecting the specific tone sequences and frequencies of system information tones as generally practiced in the United States. The invention is equally applicable to telephone systems which use tone sequences for indicating network conditions having different timing and frequencies than the aforementioned system information tones.

Visual Basic Source Code for detection of the phone zapper is:

```
Private Sub Voice 1_ToneDetected(ByVal ToneNumber
    As Integer)
Select Case ToneNumber
    Case 1 'Tone 1 is defined to detect a TeleZapper
        DetectedTeleZapper=True
    Case 2 'Tone 2 is defined to detect an OI
        DetectedTeleZapper=False
        DetectedOI=True
End Select
End Sub
```

As would be appreciated by persons of ordinary skill in the art, other programming languages could be used for programming the telephone dialer 10.

The present invention provides an improved telephone dialer whereby the presence of a zapping device on a customers telephone line will not prevent important messages to be delivered to the customer's premise.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for a telephone dialing apparatus to deliver a message to a customer premise, comprising the steps of:
   initiating by the apparatus, a call to the customer premise by dialing a telephone number;
   enabling the apparatus to receive an off-hook signal from the customer premise;
   enabling the apparatus to detect a first tone if the off-hook signal is received;
   enabling the apparatus to detect a second tone if the first tone is detected;
   terminating the call if the second tone is detected; and
   transmitting the message to the customer premise if the second tone is not detected.

2. The method of claim 1, wherein the first tone is a first tone of a system information tone signal.

3. The method of claim 2, wherein the system information tone signal is an operator intercept signal.

4. The method of claim 1, wherein the second tone is a third tone of a system information tone signal.

5. The method of claim 4, wherein the system information tone signal is an operator intercept signal.

6. A computer readable medium encoded with software code capable of being executed by a computer,
   the code for delivering a message to a customer premises by a telephone dialing apparatus, the code comprising:
   code for initiating by the apparatus, a call to the customer premise by dialing a telephone number;
   code for enabling the apparatus to receive an off-hook signal from the customer premise;
   code for enabling the apparatus to detect a first tone if the off-hook signal is received;
   code for enabling the apparatus to detect a second tone if the first tone is detected;
   code for terminating the call if the second tone is detected; and
   code for transmitting the message to the customer premise if the second tone is not detected.

7. The computer executable code of claim 6, wherein the first and second tones correspond to first and third tones respectively of an operator intercept signal.

* * * * *